(12) United States Patent
Hubertus Maria van Rooij et al.

(10) Patent No.: US 7,306,532 B2
(45) Date of Patent: Dec. 11, 2007

(54) TRANSMISSION CHAIN

(75) Inventors: Jacobus Hubertus Maria van Rooij, BA Nuenen (NL); Johannes Henricus Nelissen, AJ Geldermalsen (NL)

(73) Assignee: Gear Chain Industrial B.V. (NL)

( * ) Notice: Subject to any disclaimer, the term of this patent is extended or adjusted under 35 U.S.C. 154(b) by 0 days.

(21) Appl. No.: 11/177,080

(22) Filed: Jul. 8, 2005

(65) Prior Publication Data

US 2006/0030442 A1    Feb. 9, 2006

(51) Int. Cl.
F16G 13/04    (2006.01)

(52) U.S. Cl. .................................. 474/215; 474/216

(58) Field of Classification Search .............. 474/215, 474/214, 216, 217, 206, 245
See application file for complete search history.

(56) References Cited

U.S. PATENT DOCUMENTS

| | | | |
|---|---|---|---|
| 1,849,684 A | | 3/1932 | Morse |
| 2,755,677 A | * | 7/1956 | Bremer ...................... 474/215 |
| 3,016,755 A | | 1/1962 | Dittrich |
| 3,043,154 A | * | 7/1962 | Karig et al. ................ 474/215 |
| 3,089,346 A | | 5/1963 | Dittrich et al. |
| 3,138,034 A | | 6/1964 | Dittrich et al. |
| 4,337,057 A | * | 6/1982 | Horowitz et al. .......... 474/242 |
| 4,581,001 A | * | 4/1986 | Rattunde et al. ........... 474/214 |
| 4,764,158 A | * | 8/1988 | Honda et al. ............... 474/212 |
| 5,318,485 A | * | 6/1994 | Bateman ..................... 474/245 |
| 5,419,743 A | * | 5/1995 | Takeda et al. .............. 474/157 |
| 5,728,021 A | * | 3/1998 | van Rooij et al. .......... 474/229 |
| 6,260,345 B1 | | 7/2001 | Kanehira et al. |
| 2002/0173393 A1 | * | 11/2002 | Skurka et al. .............. 474/215 |
| 2005/0202915 A1 | * | 9/2005 | Pichura et al. .............. 474/206 |

FOREIGN PATENT DOCUMENTS

| | | |
|---|---|---|
| DE | 83336 C | 11/1895 |
| EP | 0 741 255 B2 | 5/2000 |
| GB | 302 910 A | 7/1929 |

* cited by examiner

*Primary Examiner*—Richard Ridley
*Assistant Examiner*—James Pilkington
(74) *Attorney, Agent, or Firm*—Ostrolenk, Faber, Gerb & Soffen, LLP

(57) ABSTRACT

Transmission chain constructed from a number of links intercoupled by pivot assemblies, each comprising a first and a second elongated pin of which at least one cooperates with its ends, while transmitting a force, with a pair of pulley sheaves, while during operation one pin rolls with a curved longitudinal surface over the opposite, essentially flat longitudinal surface of the second pin, both pins having mutually different cross-section configurations and a difference in the configuration of the transition between the rolling surface of the second pin to the upper and lower respectively longitudinal edge thereof and/or a mutual difference in height between the first and the second pin respectively.

4 Claims, 4 Drawing Sheets

TRANSMISSION CHAIN

This application claims priority under 35 U.S.C. §119 of Netherlands Patent Application Serial No. 1026773, filed Aug. 3, 2004.

BACKGROUND OF THE INVENTION

The invention relates to a transmission chain with a number of links coupled by pivot joint assemblies, each comprising a first and a second elongated pin of which the first pin rolls, during operation, with the curved longitudinal surface thereof over the opposite, longitudinal and essentially flat surface of the second pin while in each joint assembly at least one of the pins thereof is destined to cooperate in a force transmitting way with the opposite sheaves of a pair of pulley sheaves, and in which both pins have mutual different cross-section configurations.

DISCUSSION OF THE PRIOR ART

A transmission chain as described above is disclosed in EP-0 741 255 B2 in the name of applicant and in the corresponding U.S. Pat. No. 5,728,021. In this known chain the openings in the links, which accommodate the first and the second pin respectively have a number of curved boundary transitions with a relatively small radius of curvature. This results during operation in local stresses in the body of the link. When such a chain is to be used to transmit a torque which is relatively small in relation to the dimensions of the chain there are no problems, but when one wants to increase the torque without increasing the dimensions of the chain and particularly when one wants to decrease the pitch of the chain (thus the distance between the joint assemblies) this phenomenon can result into problems. However, decreasing the pitch of the chain may be necessary to counteract the generation of noise or when one wants the chain to have a compact structure.

U.S. Pat. No. 3,043,154 discloses a link chain destined to be used in combination with sprocket wheels, thus not a transmission chain of the kind referred to. In this chain the openings in the links have an essentially circular configuration corresponding to the circular envelope of the combined outer surfaces of the pins accommodated therein. Here the problem which the invention aims to solve does not even arise.

The same goes for the chain known from DE 83 336.

U.S. Pat. No. 1,849,684 discloses a chain of which each link is provided with two teeth for cooperation with sprocket wheels, thus a chain different from the kind according to the present invention. The intercoupling pivot joints comprise two mutually different pivot pins, one having a flat and the other having a curved elongated surface, rolling over each other. Here the operating conditions and problems are essentially different from the ones encountered in a transmission chain according to the invention, because the teeth of a gear wheel over which such a chain runs cooperate directly with the toothed links of the chain, not with the pivot pins. The problem solved by the invention does not exist here.

The same arguments apply to the chain as known from GB 302 910.

Finally U.S. Pat. No. 6,260,345 B1 discloses a silent transmission chain, also with toothed links, intercoupled by rocker joints, in which the openings in the links which each accommodate two rocker pins have an essentially circular configuration, the same as in U.S. Pat. No. 3,043,154. Here, too, the problem to be solved by the invention does not even arise.

None of these publications disclose or even suggest the particular solution proposed by the present invention to be described hereafter.

SUMMARY OF THE INVENTION

The invention aims to obviate the drawbacks. According to the invention to this end it is proposed that there is a difference in the configuration of the transition from the rolling surface of the second pin to the upper respective lower longitudinal edge thereof and/or there is a difference in height, between the first and the second pin respectively.

This measure has as a result that the respective boundaries of the openings in the links will have a curved outline with a greater radius of curvature, also when the chain is compact and thus has a small pitch while, as stress analysis has shown, no (excessive) strains occur in the bodies of the links.

Preferably one will use a configuration in which this flat longitudinal surface of the second pin merges, near to the upper and lower longitudinal edge thereof, via a in cross-section curved transition plane which is directed away from this longitudinal surface into the adjacent, broadened, head end part of the pin.

Preferably furthermore the cross-sections of the curved transition planes correspond with the outline of the surface parts of the first pin which cooperate therewith.

However one can also use a configuration in which the height of the second pin is greater than the same of the first pin.

Quite unexpectedly this measure has as a result that the respective boundaries of the openings in the links will have a curved configuration with a greater radius of curvature, also when the chain is made compact, thus with a small pitch.

Preferably the height of the second pin is 3-10% greater than the same of the first pin.

Other features and advantages of the present invention will become apparent from the following description of the invention that refers to the accompanying drawings.

DESCRIPTION OF PREFERRED EMBODIMENTS

Figure 1A:
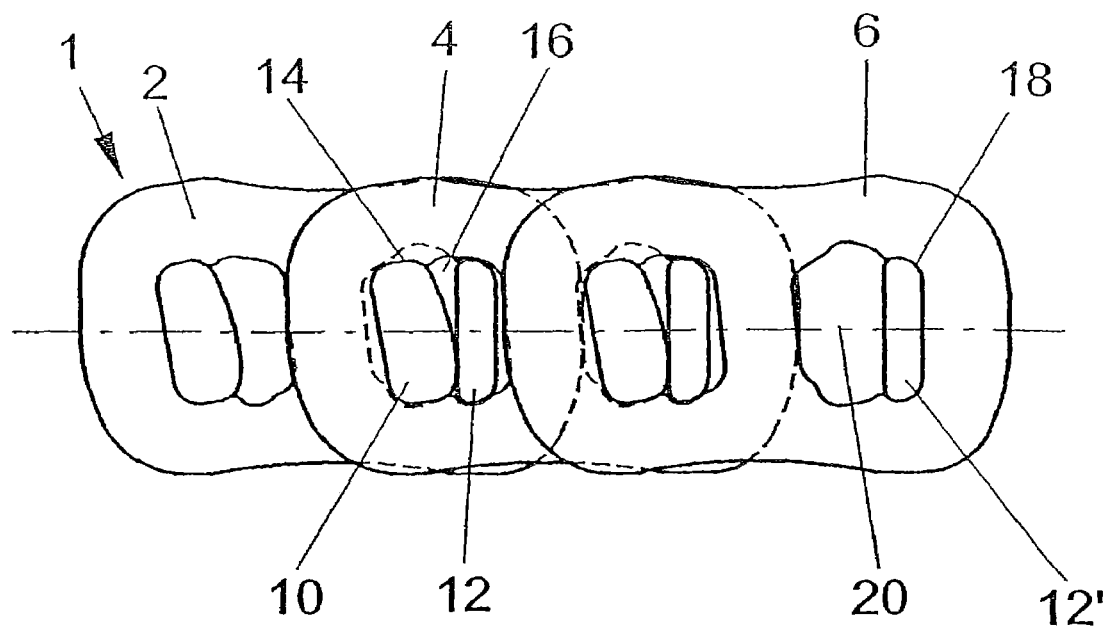
FIG. 1a shows in a side view links and pins of a transmission chain as known from the prior art with pivot joint assemblies, the chain being straightened.
Figure 1B:
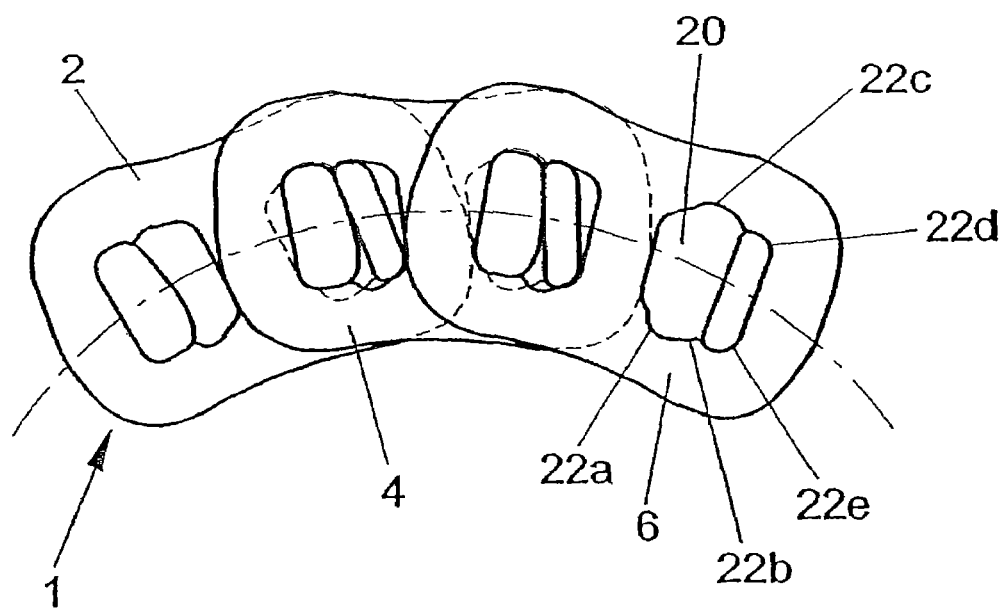
FIG. 1b shows a corresponding side view but now with a chain being curved.

FIGS. 1a and 1b show three links, indicated with reference numerals 2, 4 and 6 of a transmission chain of the kind as known from EP-0 741 255. These links are mutually coupled by pivot joint (or rocker) assemblies of which two are completely visible in FIGS. 1a and 1b; each such an assembly comprises a pin 10 and a, thinner strip-like intermediate piece 12 which cooperates therewith. The pins 12 are destined to cooperate with their respectively longitudinal ends with the opposite surfaces of a pair of pulley sheaves, such in the way as described in EP-0 741 255. As is also described in this publication each pin and each strip-like intermediate piece is fixedly accommodated in an opening in the link which partly surrounds pin and intermediate piece; pin 10, for instance, is enclosed in part of the outline, indicated with 14, of the opening 16 which is present in link 4; the strip-like intermediate piece 12' is immobilized taken up within part of the outline 18 of the opening 20 provided in link 6.

As described in EP-0 741 255 the free space which is present next to each pin and next to each intermediate piece corresponds with the envelope of the path as described by the combination of cooperating pin and intermediate piece.

FIG. 1b shows the mutual position of the parts described above such as this is in the curved part of such a chain.

The figure shows that, as a result of the condition as mentioned above with respect to the boundaries of the openings 20 in the respective links a configuration results which shows a number of transitions each having a relatively small radius of curvature, indicated for the opening 20 with reference numerals 22a-22e.

Particularly when one wants to decrease the pitch of a transmission chain (which may be desirable in connection with a reduction of the noise generated by such a chain) which measure also makes it necessary that the part of the respective link bodies to the left and the right of the respective openings must be smaller, a situation can occur in which there remains insufficient material around the openings to absorb reliably the stresses which occur in the chain during operation.

The invention obviates this problem in the first embodiment by a particular shape of the strip-like intermediate piece.

Figure 2A:
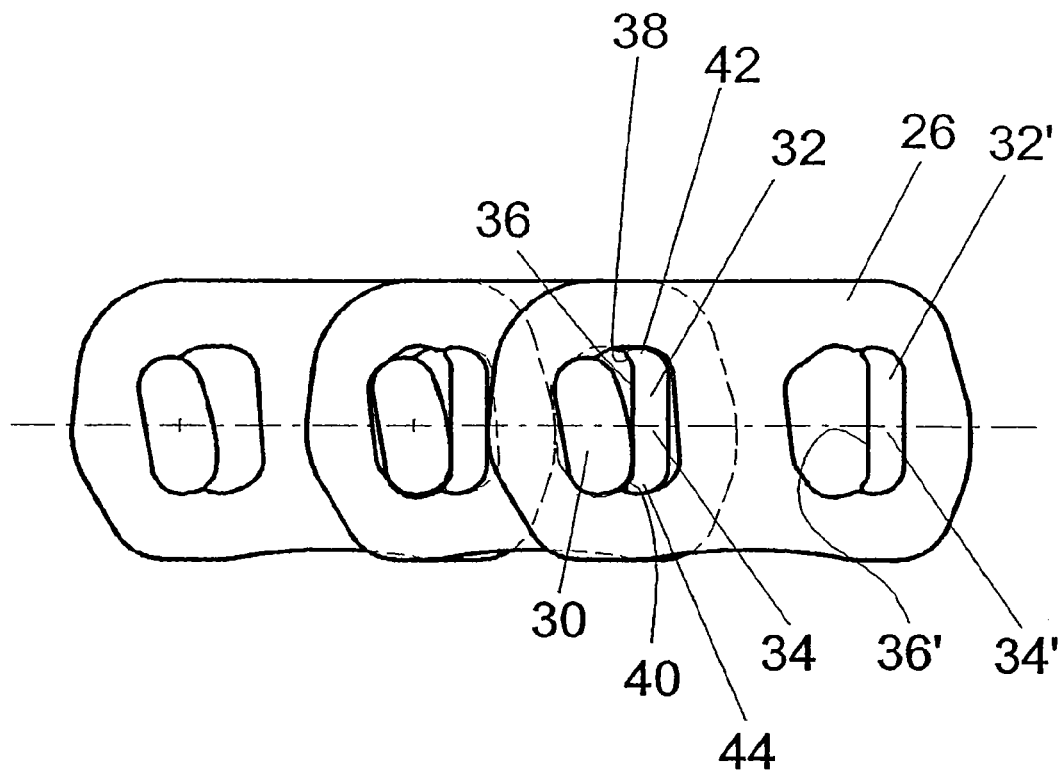
FIG. 2a shows a side view of the links of a transmission chain with pivot joint assemblies according to a first embodiment of the invention with the chain in the straightened configuration.
Figure 2B:
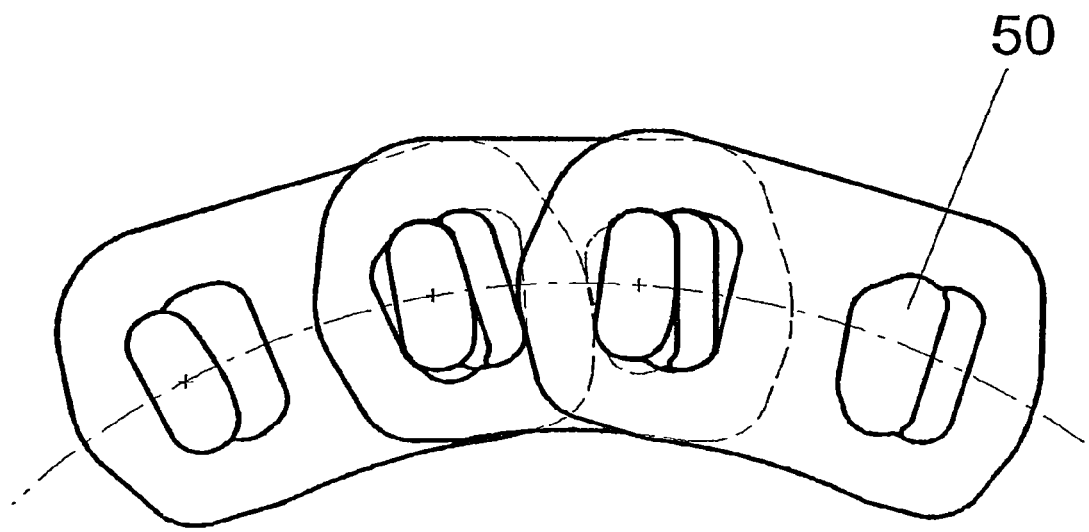
FIG. 2b a shows corresponding side view in the situation in which the chain is curved.

FIG. 2a shows a link 26 of a transmission chain having a general configuration as described above, and corresponding with the link 6 as shown in FIG. 1a, with, shown in this link, the pin 30, a first strip-like intermediate piece 32 and a second strip-like intermediate piece 32', both having the configuration as proposed by the invention. As the figure shows both strip-like intermediate pieces, shown with 32 and 32' respectively do not have the symmetrical shape as known from the prior art, but have a body part 34 and 34' of which the flat longitudinal surface 36 merges, near to the upper and lower edge respectively, via a curved transition part 38 and 40 respectively, which are directed away from the longitudinal surface 36 into the adjacent, broadened, head part 42 and 44 respectively of the pin. FIG. 2a shows a situation corresponding with the situation according to FIG. 1a, while FIG. 2b shows a situation corresponding to the situation according to FIG. 1b; as is clear from the drawings the cross-section of the curved transition planes 38 and 40 respectively correspond with the outline of the surface parts of the first pin 30 which cooperates therewith.

The figures clearly show the surprising result which is obtained by means of this measure: the openings in the links (of which the right hand opening in indicated with reference numeral 50) have as a result of the above described measure an outline with a very much smoother curvature and a greater radius of curvature as can be obtained according to the prior art, due to the larger radius of curvature of the corner of the strip.

Figure 3:
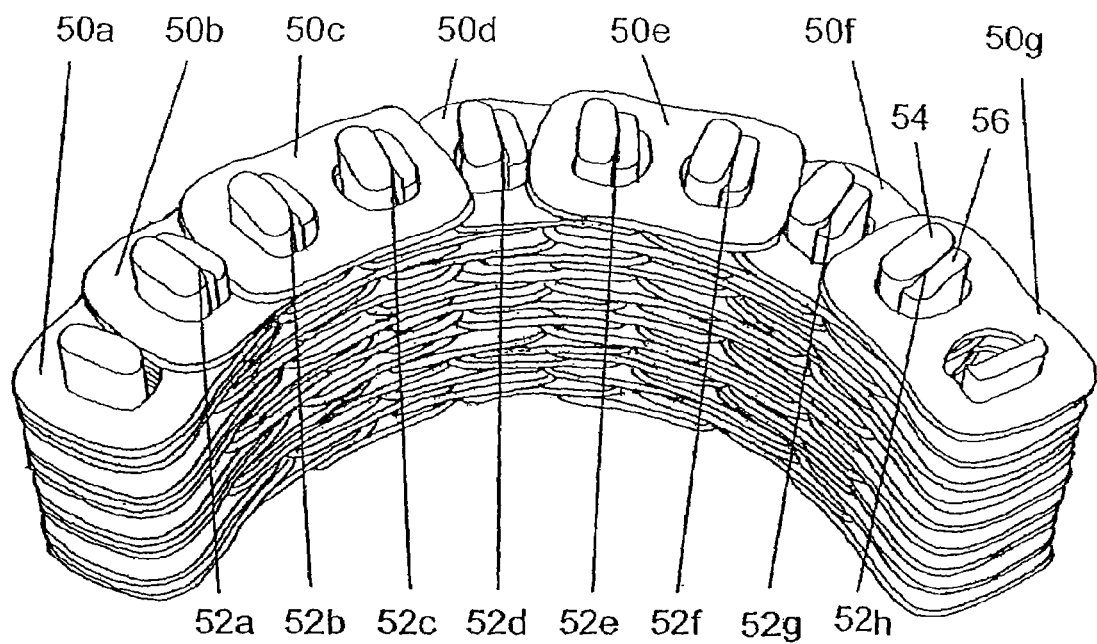
FIG. 3 shows a perspective view of a part of a transmission chain according to this first embodiment.

FIG. 3 shows in perspective a part of a transmission chain with the links 50a-50g which accommodate the pivot joints 52a-52h which each comprise a pin 54 and a strip-shaped intermediate piece 56, such as indicated for the joint 52h. The configuration as proposed by the invention of the strip-shaped intermediate pieces is clearly visible.

Figure 4:
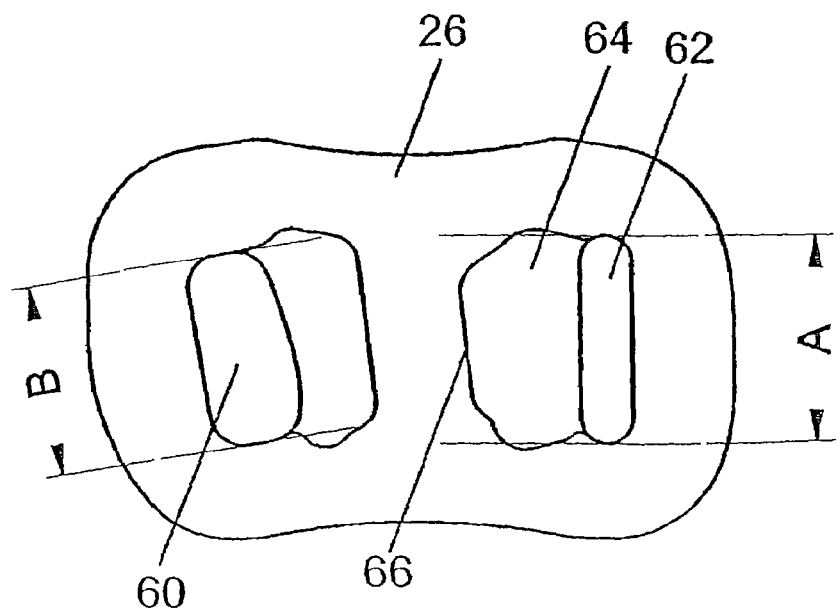
FIG. 4 shows a side view of a link of a transmission chain with pins according to a second embodiment of the invention.

A second embodiment of the invention is elucidated on the hand of FIG. 4.

FIG. 4 shows al link 26 of transmission chain with the general structure as described herein before, corresponding with the link 6 in FIG. 1a, in which are shown a pin 60, and a first strip-like intermediate piece 62, both having the general configuration according to the prior art. However here, contrary to the prior art, the height of the strip-shaped intermediate piece 62, indicated with "A" is greater than the height of the pin 60 which is indicated by "B". Preferably "A" is 3-10% greater than "B".

Very unexpectedly this results for the opening 64 which lies next to the strip-shaped intermediate piece 62 into an outline of the edges of which the radius of curvature is greater than is possible in the prior art—compare the opening 20 in FIG. 1a. As a result the stresses in the link will be lower, also when one makes the chain with a small pitch.

Both embodiments have in common that the transitions in the boundary of the openings for the pin and the strip in the links have a greater radius of curvature resulting in lower local stresses so that a higher loading of the chain is possible while the links can be thinner, the link heads can be smaller and the pitch can be reduced. Very unexpectedly as a result of the proposed measures the outline of the boundaries of the resting parts of the openings will be much smoother—with greater radiuses of curvature than possible in the prior art—and this without the necessity of increasing the thickness of the cross-section of the first pin to obtain such an effect.

Figure 5:
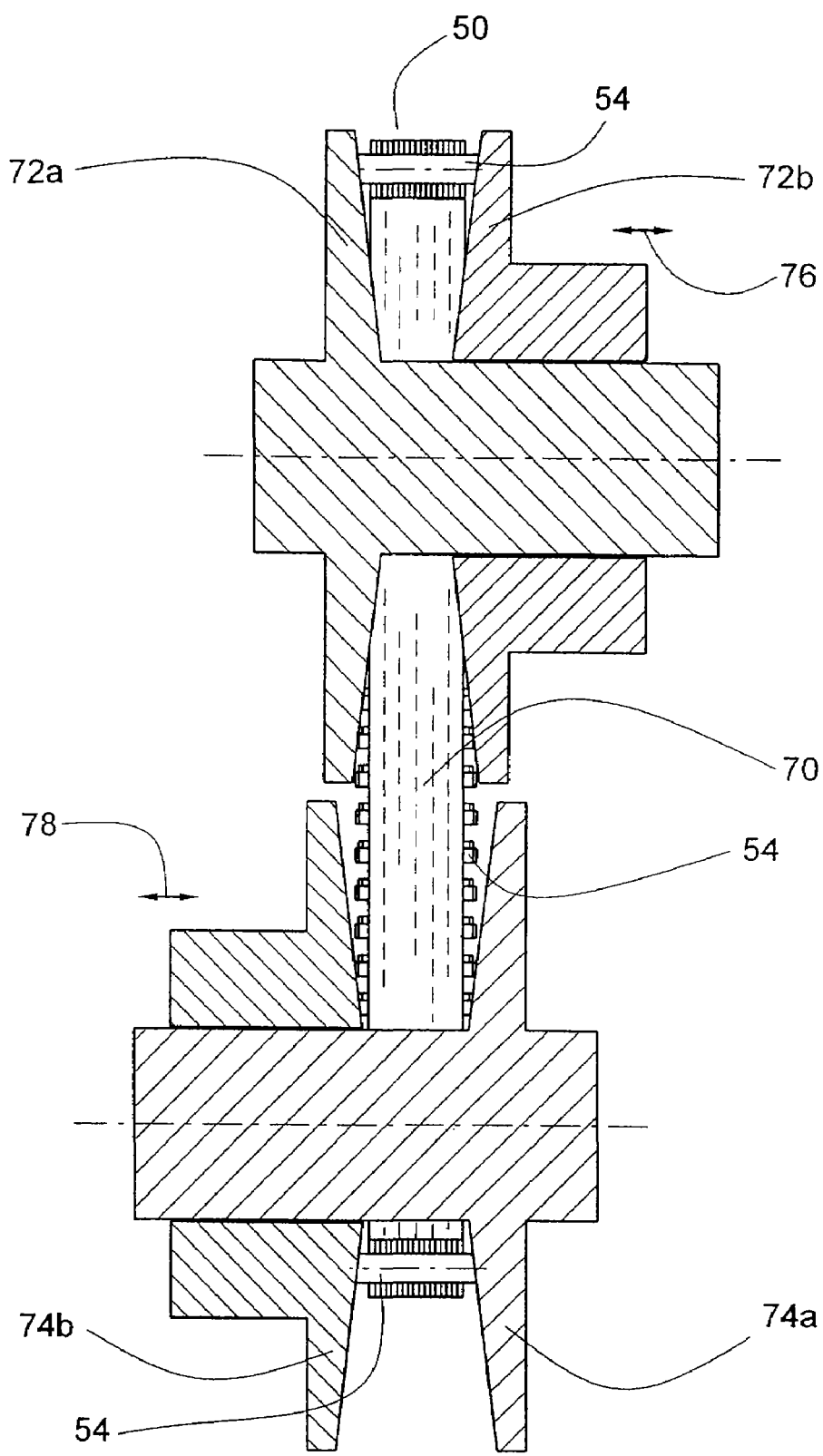
FIG. 5 shows schematically the way in which a transmission chain according to the invention cooperates with the conical surfaces of the pulley sheaves of a continuously variable transmission.

FIG. 5 shows schematically the known way in which a transmission chain, in this case the chain 70 according to the invention, cooperates with the conical surfaces of the pulleysheaves 72a, 72b; 74a, 74b of a continuously variable transmission. As shown the ends of the pins 54 are clamped between these surfaces. The pulleys 72a,72b can, for instance, be the driving pulleys, while the chain 70 transmits the torque via the pins 54 and the links 50 to the driven pulleys 74a,74b. The axial position of the conical sheave 72b is controlled by an actuator (not shown) which moves this sheave in the direction of the arrows 76 while the axial position of the conical sheave 74b is controlled by an actuator (not shown) which moves the sheave in the direction of the arrows 78. The respective movements are such that, when one sheave moves to the left (as viewed in FIG. 5) the other moves to the left, as is known prior art.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Transmission chain having a number of links coupled by pivot joint assemblies, each joint assembly comprising a first and a second elongated pin one of which is longer than the other, the longer of the first and second elongated pins being cooperating in a force-transmitting way with the opposite sheaves of a pair of pulley sheaves, and in which the height of the second elongated pin is greater is than the height of the first elongated pin, of which the first elongated pin rolls, during operation, with a curved longitudinal surface thereof over the opposite, longitudinal surface of the second elongated pin, and in which the first and second elongated pins have mutual different cross-section configurations, wherein said opposite longitudinal surface of the second elongated pin comprises a flat longitudinal surface which, near to the upper and lower longitudinal edges thereof, transitions via respective in-cross-section curved first and second transition planes which are directed away from this longitudinal surface into respective adjacent, broadened, head end parts of the second elongated pin, in which the cross-sections of the curved first and second transition planes are complementary to the outline of the surface parts of the first elongated pin which cooperate therewith, wherein the second elongated pin of each joint assembly is held immobile with respect to a portion of the number of links in the chain by first and second curved surfaces at the respective end parts of the second elongated pin on an opposite side of the second elongated pin as the first and second transition planes corresponding with the curvature of the link opening in which said pin is accommodated.

2. Transmission chain according to claim 1, in which the height of the second elongated pin is 3-10% greater than height of the first elongated pin.

3. Transmission chain according to claim 1, in which the thickness of the first elongated pin is greater than the thickness of the second elongated pin.

4. Transmission chain according to claim 1, in which the flat longitudinal surface of the second elongated pin continuously transitions into the first and second transition planes to present a concave working surface for the first elongated pin.

* * * * *